United States Patent
Predikant et al.

[15] 3,660,019
[45] May 2, 1972

[54] PROCESS FOR PURIFYING INDUSTRIAL WASTE GASES CONTAINING FLUORINE VALUES

[72] Inventors: Hans H. Predikant, Hailer; Hermann Betz, Neuenhablau; Johann Schäffer, Meerholz, all of Germany

[73] Assignee: Universal Oil Products Company, Des Plaines, Ill.

[22] Filed: Jan. 29, 1970

[21] Appl. No.: 6,791

[30] Foreign Application Priority Data

Feb. 1, 1969 Germany..................P 19 05 080.7

[52] U.S. Cl. ..........................................23/88, 23/1 A, 23/2, 23/153, 23/260
[51] Int. Cl. .......................................................C01d 3/02
[58] Field of Search.................23/88, 153, 2, 1 A; 55/71

[56] References Cited

UNITED STATES PATENTS

| | | | |
|---|---|---|---|
| 2,141,773 | 12/1938 | Strathmeyer | 23/88 |
| 2,231,309 | 2/1941 | Weber | 23/88 |
| 2,515,112 | 7/1950 | Burford et al. | 23/2 |
| 2,813,000 | 11/1957 | Quittenton | 23/2 |
| 2,943,914 | 7/1960 | Moser et al. | 23/88 |

FOREIGN PATENTS OR APPLICATIONS 838,703   7/1960   Great Britain..........................23/88

*Primary Examiner*—Edward Stern
*Attorney*—James R. Hoatson, Jr. and Philip T. Liggett

[57] ABSTRACT

Fluorine values are recovered from industrial waste gases containing fluorine and/or hydrogen fluoride, notably from gases evolved in the manufacture of aluminum through electrolysis of alumina in the presence of cryolite, by scrubbing with a highly acidic aqueous solution containing hydrogen fluoride in a first washing zone and then with an aqueous sodium hydroxide solution with formation of sodium fluoride in solution without precipitation in a second washing zone, splitting the stream of solution from each washing zone into a recycle stream for return to the zone wherein it was formed, and into a precipitation stream, and the two precipitation streams are combined to precipitate sodium fluoride, which is recovered with recirculation of resultant mother liquor to the first washing zone.

6 Claims, 1 Drawing Figure

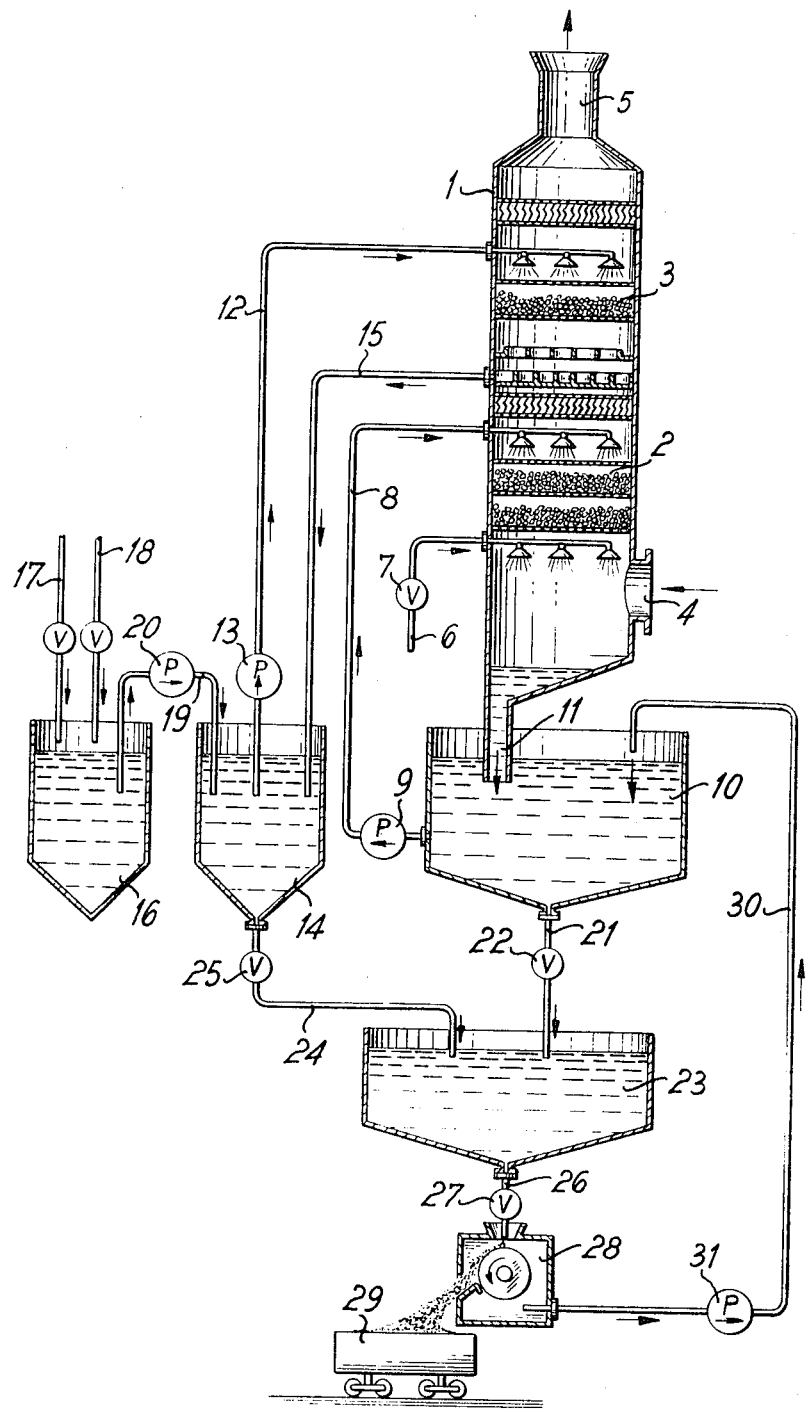

PROCESS FOR PURIFYING INDUSTRIAL WASTE GASES CONTAINING FLUORINE VALUES

The invention relates to a continuous process for purifying industrial waste gases having a content of fluorine and/or hydrogen fluoride. Such waste gases are generated, for example, during the production of aluminum from alumina, usually from bauxite, by melting flux electrolysis, cryolite ($Na_3AlF_6$) being used as fluxing agent. Additionally to fluorine compounds, such as hydrogen fluoride and elementary fluorine, such waste gases from the aluminum industry contain generally also dust and sulphur dioxide which like the fluorine compounds, require separation from the waste gases so that the waste gases may be released to the atmosphere in purified state.

It is already known to treat such industrial waste gases containing fluorine compounds for removal of said contaminations by washing with an aqueous solution of sodium hydroxide and thereby to convert fluorine and fluorine compounds to sodium fluoride which upon sufficient enrichment in the washing liquid is separated from this liquid and then used for preparing therefrom cryolite again. However, said known process has the disadvantage that for a separation of the sodium fluoride from the washing liquid the sodium fluoride must be enriched therein to an extent exceeding its solubility product, so that the sodium fluoride is precipitated within the aqueous solution of sodium hydroxide and capable of being separated therefrom, for example, by filtering. In the known method it often happens that the sodium fluoride is precipitated within the washing zone and obstructs the inlets and outlets for the aqueous sodium hydroxide, especially the inlets for the washing liquid, since they are generally designed to cause a fine distribution of the washing liquid.

Thus, it is an object of the present invention to overcome said disadvantages of known methods of purifying industrial waste gases and to obtain a continuous purifying method avoiding precipitation of sodium fluoride within the washing zone and thus, avoiding obstruction of the apparatus.

According to the invention, the continuous process for purifying industrial waste gases containing fluorine and/or hydrogen fluoride by washing the waste gases with aqueous sodium hydroxide and recovering sodium fluoride from the washing liquid is characterized in that the waste gases are washed within a first washing zone with aqueous hydrogen fluoride and within a second washing zone with the aqueous sodium hydroxide, the effluent of the first washing zone is recycled to the first washing zone until the concentration of hydrogen fluoride is at least about 3 percent by weight, preferably at least about 4 percent by weight and especially at least about 5 percent by weight, the effluent of the second washing zone is recycled to the second washing zone to enrich sodium fluoride as long as the concentration of sodium fluoride within the aqueous sodium hydroxide is still below the solubility product, and the effluents from both washing zones concentrated in such a manner are combined within a neutralization zone, the sodium fluoride precipitated thereby is separated and the mother liquor of the neutralization is recycled to the first washing zone.

An essential feature of the present process compared with the known processes is that the main amount of the hydrogen fluoride contained in the waste gases is neutralized not within the washing zones, but outside the washing zones within a separate neutralization zone. The sodium fluoride contained in the aqueous sodium hydroxide which is used according to the process of the invention as washing liquid within the second washing zone and additionally for the neutralization in the neutralization zone is always maintained below the solubility product despite the enrichment thereof. By the several features of the present process it is assured that precipitation of sodium fluoride is precluded in both of the washing zones which precipitation could result in an obstruction of the washing zones, especially the distributors for the washing liquid.

While the recycle of the two washing liquids, the aqueous hydrogen fluoride and the aqueous, sodium fluoride-containing sodium hydroxide, is carried out continuously and thus assures the continuous operation of the total method, the neutralization within the neutralization zone can be carried out continuously or discontinuously. Therefore, either a continuous controlled flow of both effluents from the two washing zones having the desired concentrations to the neutralization zone and from there to the device for separation of sodium fluoride can be provided, or the effluents of the two washing zones can be passed intermittently from collecting containers for both effluents to the neutralization zone.

Suitably, the effluents of the two washing zones are combined in such amounts that about equivalent molar amounts of hydrogen fluoride and sodium hydroxide are present within the neutralization zone. It is especially suitable to provide a small excess of sodium hydroxide, so that the neutralization mixture passed to the device for separation of sodium fluoride is somewhat alkaline. This is especially desirable with regard to the equipment requirement, since alkali-resistant separation devices are available more readily and at lower cost than separation devices resistant against hydrogen fluoride. The separation of the sodium fluoride from the neutralization mixture is carried out in a well-known manner by means of devices known for said purpose, for example, by filtration or centrifugation.

Additionally to sodium fluoride, the neutralization mixture passed to the separation device contains as solids the dust separated from the waste gases as well as possibly further solids such as, for example, sodium sulfite, if the waste gases to be purified contain sulphur dioxide. The total amount of solids is separated from the mother liquor within the separation device and discharged for conversion to cryolite. The mother liquor of the neutralization step separated within the separation device is then recycled to the cycle of washing liquid for passage through the first washing zone, and suitably it is introduced into the collecting container, where the effluent of the first washing zone is collected. According to the embodiment described above and especially preferred, said mother liquor is somewhat alkaline by addition of a small molar excess of sodium hydroxide to the neutralization zone. Such excess is not harmful to the recycling of the mother liquor to the washing liquid for the first washing zone, since the concentration of the sodium fluoride formed thereby is relatively small and does not exceed the solubility product of the sodium fluoride.

Since the solids discharged from the separation device following the neutralization zone generally still contain water, for example, when wet filter cake is produced, it is possible that within the total volume of the washing liquid cycled through the first washing zone, losses occur which can be balanced readily by introducing additional water into the first washing zone in proportion to the volume decrease. Suitably, the control of the addition of water is carried out according to the amount liquid within the collecting container for the effluent of the first washing zone. Thus, there can be provided a sensing device within said collecting container measuring the level of the liquid within said container and controlling the introduction of water into the first washing zone, for example by opening the valve in the water supplying conduit, when the level of the liquid within the collecting container decreases below a predetermined value, and closing the valve, when the level of the liquid reaches a predetermined upper value.

It is to be understood that it is also possible to discharge a portion of the mother liquor of the separation device from the unit, if this should be desired for any reason, and to balance the resultant loss of liquid within the cycle through the first washing zone by means of addition of a corresponding amount of fresh water.

The drawing shows diagrammatically a flow sheet of the process and device according to the invention and thus serves to further illustrate the invention. Although the drawing shows only one scrubber with the corresponding collecting and storage containers, it also is within the contemplation of the invention that several scrubbers with corresponding collecting and storage containers be provided in parallel the several scrubbers being operated in accordance with the same principle as already described above, or the gas leaving the upper end of the scrubber may be passed for further purification through another device operated according to the process of the present invention. Moreover, the two washing zones provided within one scrubber according to the accompanying flow sheet can be provided within separate scrubbers appropriately connected with each other. Moreover, the washing zones according to the present invention can be sub-divided in a manner providing sub-zones each of which is provided with inlet means for washing liquid.

Referring to the drawing, the scrubber 1 consists of first washing zone 2 and a washing zone 3 provided above it. Below the washing zone 2 the waste gas to be purified enters the scrubber 1 through waste gas inlet 4 and flows through the scrubber upwardly, passing first through the washing zone 2 and then through the washing zone 3 and finally leaving the scrubber through waste gas outlet 5. Water is introduced into the lower section of the scrubber 1, through conduit 6 equipped with valve 7 which water adiabatically cools the waste gas entering the scrubber through gas inlet 4 to a temperature of, for example, 70° C. and balances the liquid losses caused during operation. Aqueous hydrogen fluoride is passed through the conduit 8 equipped with pump 9 from the collecting container 10 to the washing zone 2 and is there contacted countercurrently with the waste gases flowing upwardly through the scrubber. After contact with the waste gases to be purified the aqueous hydrogen fluoride enters the collecting container 10 through the outlet 11 at the bottom of the scrubber 1 and is passed from container 10 again to the washing zone 2 through conduit 8 by means of the pump 9.

Aqueous sodium hydroxide is pumped through conduit 12 equipped with pump 13 from the collecting container 14 into the second washing zone 3 and leaves the latter after countercurrent contact with the waste gases to be purified through conduit 15 which discharges into the collecting container 14. Aqueous sodium hydroxide is delivered, if desired, from the storage container 16 equipped with supply conduits 17 and 18 to the collecting container 14 through conduit 19 equipped with pump 20.

Continuously or intermittently aqueous hydrogen fluoride, for example, concentrated by recycling to a content of 5 to 6 percent by weight, is passed through conduit 21 equipped with valve 22 to the neutralization container 23, and aqueous sodium hydroxide also enriched with sodium fluoride by recycling is passed from the collecting container 14 to the neutralization container 23 through conduit 24 equipped with valve 25. The valves 22 and 25 are controlled in such a manner that a small molar excess of sodium hydroxide relative to the amount of hydrogen fluoride flows to the neutralization container. Within the neutralization container 23 the hydrogen fluoride entering from the collecting container 10 and additionally containing dust and possibly sulphur dioxide is neutralized completely by means of the sodium hydroxide supplied from the collecting container 14, whereby the solubility product of the sodium fluoride is exceeded and sodium fluoride is precipitated. The neutralization mixture is discharged from the bottom of neutralization container 23 through conduit 26 equipped with valve 27 and separated within the centrifuge 28. The wet filter cake is discharged from the centrifuge and disposed at 29. Through the conduit 30 equipped with pump 31, the mother liquor of the neutralization mixture is recycled to the collecting container 10 and thus introduced again into the cycle of the washing liquid for the first washing zone.

Suitably, at the collecting container 10 a device not shown can be provided which senses the level of the liquid within the collecting container 10 and opens or closes the valve 7 of the conduit 6 in response to variations of said level of the liquid so as to maintain said liquid level substantially constant or at least between predetermined upper and lower level limits.

EXAMPLE

Waste gas to be purified from the production of aluminum by smelting flux electrolysis was supplied in an amount of 195,000 Nm³/h to the apparatus described above. Said waste gas had a temperature of 70° C., moisture content of 0.04 kg of $H_2O$/kg of dry air, a dust content of 140 mg/Nm³, a content of fluorine and hydrogen fluoride, calculated as fluorine, of 60 mg/Nm³ as well as a content of sulphur dioxide of 60 mg/Nm³. Thus, by introducing said waste gas into the scrubber 1, 27.3 kg of dust, 11.7 kg of fluorine and 11.7 kg of sulphur dioxide have been introduced per hour.

First within the first washing zone 2, the waste gas flowing upwardly is washed with water from the collecting container 10 which was recycled until a 6 percent solution of hydrogen fluoride had been obtained. The amount of the cycled washing liquid was 236.7 kg/h and after the mentioned enrichment with hydrogen fluoride contained 23.2 kg of dust, 10.5 kg of hydrogen fluoride, 10.0 kg of sulphur dioxide, 7.0 kg of sodium fluoride and 21.5 kg of sodium sulfite.

Thus, the efficiency of the first step was an about 85 percent removal of the dust originally contained, an about 95 percent removal of the fluorine originally present and an about 85 percent removal of the sulphur dioxide originally present.

Within the second washing zone 3, the waste gas flowing upwardly was washed with a 30 percent aqueous sodium hydroxide solution, whereby additionally 2.73 kg per hour of dust, 0.351 kg per hour of fluorine and 1.17 kg per hour of sulphur dioxide have been removed from the waste gas. Thus, within the second washing zone additionally about 10 percent of dust, about 3 percent fluorine and about 10 percent of sulphur dioxide have been removed. Now, the waste gas had such a purity that it could be delivered to the atmosphere without hesitation.

Thus, the recycled aqueous hydroxide absorbed 0.795 kg of sodium fluoride, 4.6 kg of sodium sulfite per hour and additionally dust.

After a starting period in which the hydrogen fluoride in the solution in the collecting container 10 had been concentrated to 6 percent, 236.7 kg per hour of hydrogen fluoride solution were passed through the conduits 21 and 25 continuously from the collecting container 10 and 215.8 kg per hour of aqueous sodium hydroxide lye from collecting container 14 were passed into the neutralization container 23. The resultant neutralization mixture contained 23.2 kg of dust, 30.4 kg of sodium fluoride, 45.8 kg of sodium sulfite and 353.1 kg of water. On separation within a filter centrifuge there were obtained 100.7 kg of filter cake comprising 23.2 kg of dust, 20.0 kg of sodium fluoride, 7.5 kg of sodium sulfite and 50.0 kg of water. Said filter cake was discharged and converted to cryolite. The mother liquor from the filter centrifuge comprised 351.8 kg per hour and consisted of 303.1 kg of water, 10.4 kg of sodium fluoride and 38.3 kg of sodium sulfite. The mother liquor was recycled to the collecting container 10 through conduit 30.

We claim:

1. Continuous process for purifying industrial waste gases containing at least one component selected from the group consisting of fluorine and hydrogen fluoride by washing the waste gases by means of aqueous sodium hydroxide and recovering sodium fluoride from the washing liquid, characterized in that the waste gases are washed within a first washing zone by means of aqueous hydrogen fluoride and within a second washing zone by means of the aqueous sodium hydroxide, the effluent of the first washing zone is recycled to the first washing zone until the concentration of hydrogen fluoride is at least about 3 percent by weight, the effluent of the second washing zone is recycled to the second washing zone to enrich it with sodium fluoride while maintaining the concentration of the sodium fluoride within the aqueous sodium hydroxide below the limit of solubility of the sodium fluoride, and the effluents of both washing zones enriched in said manner are combined within a neutralization zone separate from both said washing zones, the sodium fluoride precipitated thereby is separated and the mother liquor of the neutralization is recycled to the first washing zone.

2. Process as claimed in claim 1 wherein the effluent of the first washing zone is recycled to the first washing zone until the concentration of hydrogen fluoride is at least about 4 percent by weight.

3. Process as claimed in claim 1 wherein the effluent of the first washing zone is recycled to the first washing zone until the concentration of hydrogen fluoride is at least about 5 percent by weight.

4. Process as claimed in claim 1, wherein the effluents of the two washing zones are combined in such amounts that about equivalent molar amounts of hydrogen fluoride and sodium hydroxide are present in the neutralization zone.

5. Process as claimed in claim 1 wherein the effluents of the two washing zones are combined in such amounts that a small molar excess of sodium hydroxide relative to the amount of hydrogen fluoride is present in the resultant mixture in the neutralization zone whereby alkali-resistant equipment may be employed.

6. Process as claimed in claim 1, wherein additional water is introduced into the first washing zone in proportion to the volume decrease of the washing liquid within the liquid cycle through the first washing zone.

* * * * *